Figure 1:
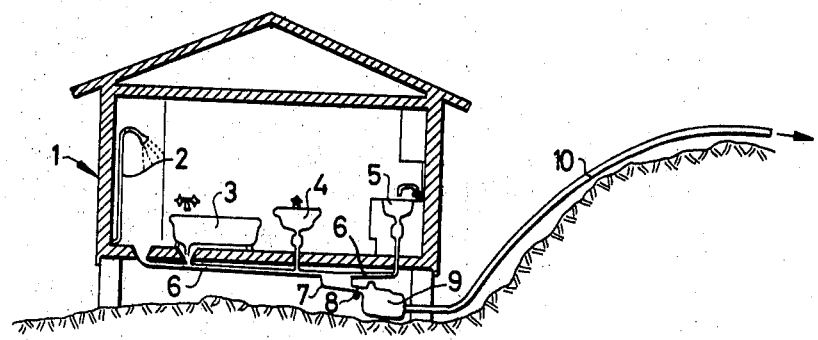

United States Patent [11] 3,568,838

[72] Inventors Wolter Appelgren
 Saltsjobaden;
 Jan-Olov Jorsback, Enskede; Gudmund
 Naeslund, Bromma; Ernst Rolf Olsson,
 Vallingby, Sweden
[21] Appl. No. 714,206
[22] Filed Mar. 19, 1968
[45] Patented Mar. 9, 1971
[73] Assignees AB Landsbygdens Frilidsbebyggelse
 Stockholm, Sweden;
 Viak AB Vallingbyplan
 Vallingbys, Sweden
[32] Priority Mar. 23, 1967
[33] Sweden
[31] 4134/1967

[54] SEWERAGE SYSTEM FOR HOUSES,
 PARTICULARLY IN RURAL AREAS
 12 Claims, 2 Drawing Figs.
[52] U.S. Cl. ................................................. 210/136,
 210/170, 210/185, 210/380, 210/179, 210/258,
 210/501
[51] Int. Cl. ......................................................... B01d 33/06
[50] Field of Search............................................. 210/123,
 153, 170, 185, 241, 257, 258, 360, 416, 542, 179,
 377, 136, 780, 501

[56] References Cited
UNITED STATES PATENTS

| | | | |
|---|---|---|---|
| 813,368 | 2/1906 | Dutcher | 210/360X |
| 1,046,172 | 12/1912 | Goff | 210/258X |
| 1,109,740 | 9/1914 | Dehn | 210/123X |
| 2,103,434 | 12/1937 | Pennebaker | 210/185 |
| 2,938,630 | 5/1960 | Novak | 210/258X |
| 3,207,627 | 9/1965 | Dietzel et al. | 210/179X |
| 3,268,080 | 8/1966 | Eberly, Jr. | 210/184X |
| 3,317,047 | 5/1967 | Hansen | 210/257X |
| 3,318,449 | 5/1967 | Jennings et al. | 210/258X |

Primary Examiner—Reuben Friedman
Assistant Examiner—C. M. Ditlow
Attorney—Fred C. Philpitt ABSTRACT: A sewerage system for houses comprises a mechanical strainer, preferably of the centrifugal filter type, for immediate and efficient separation of solid and semisolid impurities from the waste water before the latter is pumped out through a narrow sewer. Mechanical strainer and pump form a convenient installation unit. A replaceable or renewable filter is included in the mechanical strainer.

PATENTED MAR 9 1971      3,568,838

SEWERAGE SYSTEM FOR HOUSES, PARTICULARLY IN RURAL AREAS

This invention relates to sewerage systems, and particularly to sewerages for buildings in rural areas such as villas and recreation houses, but there is nothing to prevent the application of the invention in densely populated areas and in cities.

The invention is based on the idea and observation that many of the difficulties hitherto involved in the disposal of waste water are caused by the great quantity of solid and semisolid impurities usually remaining therein for a considerable period of its transportation, which has to take place through pipelines or the like. Already from the viewpoint of transportation it would thus be desirable to remove such solid and semisolid impurities from the waste water as early as possible. Experiments have also proved that an early separation of solid and semisolid impurities, not yet dissolved in the water, makes it possible to obtain a higher degree of purification, because most of the impurities are of biological origin and require a certain time for decomposition or dissolution. If the separation takes place before the decomposition or dissolution processes have advanced very far, the amount of dissolved impurities in the waste water will, in fact, be surprisingly low and at the same time the occurrence of fermentive and putrefactive processes in the water will be substantially avoided or at least delayed, which in turn will facilitate drainage.

Based on these considerations the invention suggests a sewerage system for houses having waste water outlets, as from bathing, washing and other water-consuming equipments and rooms, which is characterized by the combination of a mechanical strainer provided within the house proper or at least the immediate proximity thereof, such as underneath the bottom joists in a cellarless house, and in direct connection with said waste water outlets, said mechanical strainer including filter means capable of removing from the passing waste water practically all undissolved solid and semisolid impurities contained therein, including fat accumulations, saponification remnants, gels and the like not already dissolved, and of pumping means for forwarding the partially purified waste water emitted from said strainer through narrow conduit means to recipient, if desired via an equipment for additional chemical and/or biological purification.

Thus, the main idea is that the waste water should reach the mechanical strainer immediately after being contaminated, of course with disregard of such minor waste water quantities that may remain in any necessary traps or be temporarily halted in a capacity compensating tank and in the feed lines to the strainer. The filter of the mechanical strainer should have so small pores that its purifying effect will at least equal the effect obtained by conventional sludge separation and subsequent filtering of the water through sand filters, now commonly used in municipal sewage treatment plants.

Even though several different kinds of filter type mechanical strainers are useable in a system according to the invention, it has been found most advantageous to use centrifugal mechanical strainers, in which the recently contaminated waste water is received in a filter container that can be brought to rotate quickly preferably by means of an electromotor, so that the waste water is forced by centrifugal action and under high pressure through a replaceable or renewable filter with high separating capacity. After mechanical purification in the filter the waste water is discharged by a pump that is preferably capable of forwarding it under pressure through a narrow sewer conduit, e.g. in the form of a flexible hose. In this way the discharge conduit can be arranged without slope which highly simplifies the installation. Thanks to the early and efficient mechanical purification of the waste water, the pump used for its discharge can be of a much simpler and cheaper construction than is possible in case the pump has to forward waste water containing solid and semisolid impurities.

In many cases, especially when thinly populated areas are concerned, the mechanical purification of the waste water may be sufficient to allow final discharge of the water into a natural recipient, but in more densely built-up areas and when the available recipient does not have the sufficient capacity, the partially purified waste water can instead be fed to a suitable equipment or plant for additional chemical and/or biological purification before being finally disposed of such as into a river, a lake or the sea. Of course, such an equipment or plant for additional purification of the water may to advantage serve several houses, for instance within an area of recreation houses, and be much more inexpensive both in installation and running than a conventional sewage system to which the waste water is fed directly without previous and very early mechanical purification. However, an additional chemical purification may also be provided for in close connection to the mechanical strainer equipment, because the discharge pump of the latter can easily force the mechanically purified waste water through a compact and easily accommodated chemical purifier unit, in which the active chemical components need renewal only at fairly long intervals.

The filter in the mechanical strainer can, as already mentioned, be replaceable and consist e.g. of a fine-porous cellulose material or of infusorial earth, carbon or the like enclosed in suitable, pervious wrappings. Some agent for chemical treatment of the waste water, e.g. for sterilizing or binding certain substances such as phosphates, can to advantage be embedded in or admixed to the filter material. If so, fresh material for chemical treatment of the waste water will be supplied automatically at each filter replacement without the aid of special dosing devices. The contaminated filters from the mechanical strainer together with the impurities contained in them can in such cases to advantage be burnt up in a house furnace or be neutralized centrally after being collected together with rubbish or excrement.

However, as already mentioned the filter can also be renewable or regenerable and, if so, it can consist e.g. of porous, sintered metal bodies or of ceramics, infusorial earth, silica gel and other inorganic, preferably mineral materials, and the restoration can suitably be effected by burning or heating, e.g. electric heating. To this end electric resistance heating wires with or without protective sheathings or coverings may be embedded directly in the filter material so that a regeneration of the filter can take place while it remains in place in the strainer. Separate extraction of the completely sterile ash residues may then also be provided for. In such cases the filter can also to advantage be utilized to receive, via suitable sluice devices or the like, combustible kitchen waste, rubbish and even feces from one or more closets in the building, which should then preferably work with the least possible amount of flushing water or possibly without any water at all, if they could be arranged with direct drop into the strainer.

It will be obvious that means must be provided for shutting off the waste water feed to the strainer when the filter is to be replaced or regenerated, respectively, and consequently the system should before the strainer have a sufficient volume for short storing of the waste water. This is desirable also in order to obtain a certain capacity compensation or load distribution, because it would be rather wasteful to dimension the strainer for such temporary high-load periods as will occur e.g. at times of the morning toilet, dish washing after meals, bathing and clothes-washing. This withholding or capacity compensating volume may be afforded by the waste water pipes leading to the strainer but, as a rule, the provision of a special tank for this purpose close to the strainer is preferred. This tank should then, if possible, be so designed and located that it can gradually empty all its contents, including the impurities, into the strainer with a self-cleaning slope. For a more complete understanding of the invention an embodiment thereof will now be described with reference to the accompanying drawing, wherein, FIG. 1 is a very diagrammatic cross section of a cellarless recreation house provided with a sewerage system according to the invention, and FIG. 2 is a longitudinal section through a mechanical strainer and pump unit forming part of said sewerage system.

Figure 2:
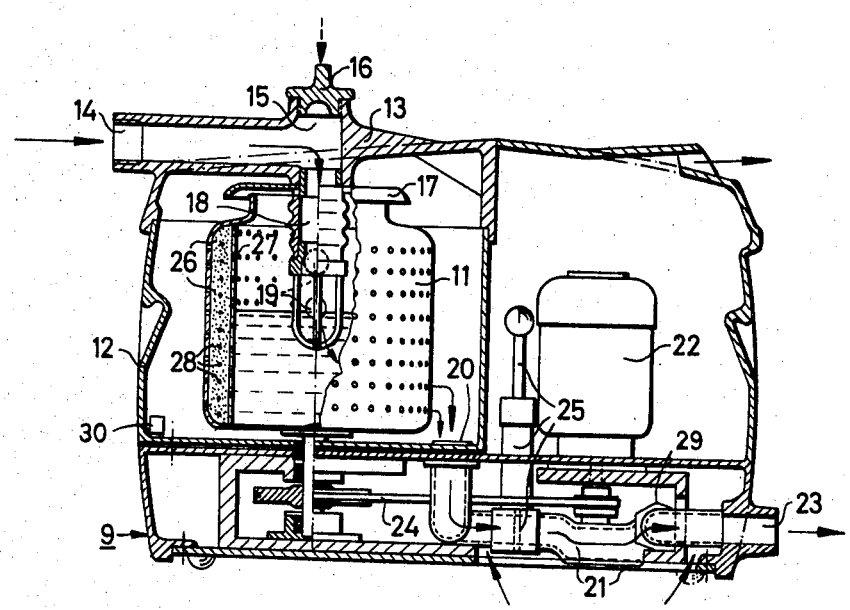

Referring now to FIG. 1, the diagrammatically shown recreation house 1 is provided with a shower bath 2, a bath tub 3, a wash basin 4, a kitchen sink 5 and other water-consuming equipment, such as a washing machine (not shown), which are all provided with waste water outlets, such as a floor outlet in certain cases, which are connected by pipes 6 to a common capacity compensating tank 7 placed under the bottom joists of the house and connected in its turn, via a shutoff valve device 8 of a suitable type, to a mechanical strainer and pump unit which is generally designated by 9 and will be described in detail in the following. From the unit 9, the partially purified waste water is pumped through a relatively narrow pipeline 10 to a suitable recipient, if desired via an equipment (not shown) for additional chemical and/or biological purification of the waste water. Also the strainer and pump unit 9 is located within the immediate proximity of the house and, in the case as shown, just beneath the bottom joists of the house, and the tank 7 is so shaped and located relative to the unit 9 that it can gradually empty its entire contents with a self-cleaning slope into the strainer. The tank 7 has for its sole purpose to distribute the load on the strainer unit 9 so that the latter can be given a reasonably small capacity and, of course, the tank 7 may in certain cases by entirely omitted.

Thanks to the very early mechanical purification of the waste water from the outlets of the house taking place in the strainer portion of unit 9, whereby practically all solid and semisolid impurities not already dissolved are separated from the waste water, a simple pump outfit will suffice to forward the waste water without inconveniences under a sufficient pressure to allow the use of a pipe 10 with a very modest flow area as compared with the usual sewer conduits and, besides, this pipe 10 can be arranged without slope, for instance directly on the ground, and pass over at least reasonable ground elevations, as indicated to the right in FIG. 1. Through the early and extensive purification in direct connection with the house proper the risk of sedimentation and obstruction of the discharge or drain pipe 10 is practically eliminated.

It should be obvious that, if the house in question has a cellar, the tank 7 as well as the strainer and pump unit 9 should preferably be located in this cellar. When the bottom joists of the house are resting directly on the ground, the tank (if provided) and the strainer unit 9 must instead be located in a suitable excavation and possible protected by an extension of the bottom joists or by some other suitable covering. In case the house has several floors and the shower 2 or bath tub 3 can suitably be located on the upper floor, or in any case in a space with elevated floor level, the tank 7 as well as the strainer unit 9 may, of course, be placed above the bottom joists, for instance directly underneath the kitchen sink 5. Several strainer units may also be used in the same house, one for each waste water outlet, or a group of such outlets, in which case the different units may discharge their purified water through a common conduit.

FIG. 2 shows in simplified form an apparatus or unit corresponding to that designated by 9 in FIG. 1 and which comprises the mechanical strainer and a pump for discharging the purified waste water. The mechanical strainer, which is accommodated in the left-hand portion of the unit, comprises primarily a rotary centrifugal vessel 11 located in a container 12 having a removable lid portion 13, which is provided with alternative connections 14 and 15 for the waste water pipes in the house, one of these connections, 15, being shown closed by a screw plug 16. The lid 13 carries on its underside a cap 17 which covers, with a certain play, the upwardly facing, constricted mouth of the centrifugal vessel 11, and extending centrally through this cap 17 down into the centrifugal vessel 11 is an inlet pipe 18 for the waste water to be purified. At its lower end this inlet pipe is provided with a float valve 19, which prevents overfilling of the centrifugal vessel 11. In the bottom of the container 12 is an outlet 20 communicating with a pump 21, which is driven by an electromotor 22 and from which the waste water is discharged under pressure through a connection 23 for the discharge pipe 10 in FIG. 1. Between the pump outlet and the connection 23 there is a common nonreturn or check valve 29. Over a suitable transmission 24 the motor 22 is also driving the centrifugal vessel 11, and the motor can to advantage be controlled by a conventional liquid level sensing means 30, in the container 12 and/or in the centrifugal vessel 11, so that the motor will be started and stopped automatically and work only intermittently in response to the waste water feed. The pump 21 may very well be a small uncomplicated centrifugal pump as long as particularly high pressures are not required in the discharge line. The nonreturn valve 29 is, of course, provided after the pump to prevent any backflow of waste water from the discharge line when the pump is not operating.

At 25, between the container 12 and the pump 21 is interposed a manually extractable emergency filter screen of such a design that the connection between the container and the pump will become closed when the filter screen proper is extracted for cleaning. This component serves as a safety means, which will soon be obstructed and cause a blocking of the waste water discharge in case impurities for any reason would be able to pass through the mechanical strainer, e.g. if the insertion of a new filter has been forgotten after removal of a choked one. If this happens, the motor will continue to operate for a long period and probably give an indication that something is not in order.

The centrifugal vessel 11, which constitutes the strainer proper, is provided with perforated walls inside which is a layer 26 of filter material that is held in place by an inner perforated partition or grating 27. In the present case the filter material 26 is supposed to be regenerable through heating to a high temperature by means of electric resistance wires 28, which are embedded in the material and may be temporarily connected, in any suitable manner, not shown, such as through slip rings, to the electric line when regeneration of the filter material 26 is needed. In the example shown this regeneration is supposed to be manually controlled, the valve means 8 in FIG. 1 then being closed and the container 12 being drained before current is supplied to the resistance wires 28. However, there is nothing to prevent automation of the regeneration process, e.g. by means of a timer or by means recognizing the flow resistance in the filter material 26.

Since the mechanical strainer is in the form of a centrifugal filter, the waste water will pass through the filter material under a pressure generated by the centrifugal action, and this has proved very favourable because it highly increases the strainer capacity. If the strainer is serving only one or a few waste water outlets with a moderate discharge volume, however, the waste water may, of course, be left to run by itself through the filter or be sucked therethrough by the pump. As already mentioned the regenerable filter material 26 may also be substituted by replaceable filter insets that can be removed by hand after lifting the lid 13 of the apparatus.

The apparatus or unit shown in FIG. 2 is only intended as an example of a suitable strainer design for a rather simple system. As already pointed out, the centrifugal vessel 11 that serves as a strainer may also be constructed so as to receive combustible waste and even feces and to serve as an incinerator for destruction also of impurities that are not highly diluted with water. In case great quantities of ash residues from filter regeneration and other combustion processes can be expected, some kind of exhausting or vacuum cleaning device may be provided for extraction of such residues from the centrifugal vessel.

We claim:

1. A waste water treating apparatus for use in a household sewerage system and comprising in combination a container having a removable lid portion, an open perforated centrifugal vessel rotatably mounted in said container, waste water inlet means opening from above into said vessel, an intake restricting valve means in said inlet means, water outlet means at the bottom of said container, a water discharging pump connected to said outlet means of the container, a discharge conduit connection communicating with said pump, and motor means for driving said centrifugal vessel and water discharging pump, said centrifugal vessel being adapted to receive filter means for effectively straining the waste water passing therethrough.

2. A waste water treating apparatus according to claim 1, wherein a removable filter screen is interconnected between said container outlet means and said pump to serve as an emergency filter in the event of failure of said aforementioned filter means.

3. A waste water treating apparatus according to claim 1, wherein a nonreturn valve is interconnected between said pump and said discharge conduit connection.

4. A waste water treating apparatus according to claim 1, wherein said centrifugal vessel and said water discharging pump are mechanically driven by a single driving motor common to both.

5. A waste water treating apparatus according to claim 1, wherein means for sensing the liquid level in said container is provided to automatically start and stop said motor means.

6. A waste water treating apparatus according to claim 1, wherein a capacity compensating tank is connected to said waste water inlet means to be primarily passed by the waste water, said tank having a bottom sloping towards said waste water inlet means so as to drain therethrough when said intake restricting valve means so permits.

7. A waste water treating apparatus for use in a household sewerage system and comprising in combination a container having a removable lid portion, a perforated centrifugal vessel open at one end and rotatably mounted in said container, waste water inlet means opening from above into the open end of said vessel, an intake restricting valve means in said inlet means, water outlet means at the bottom of said container, a water discharging pump connected to said outlet means of the container, a discharge conduit connection communicating with said pump, motor means for driving the centrifugal vessel and water discharging pump, liquid level sensing means within said container for governing the operation of said motor means, and filter means in the centrifugal vessel capable of effectively straining the waste water passing therethrough so as to separate substantially all solid and semisolid contaminants, including fat accumulations and saponification remnants therefrom and to keep these separated contaminants substantially dry until disposed of.

8. A waste water treating apparatus according to claim 7, wherein said filter means of said centrifugal vessel is replaceable.

9. A waste water treating apparatus according to claim 8, wherein said replaceable filter means comprises filter material incorporating agents capable of assisting in the waste water purification process by chemical action.

10. A waste water treating apparatus according to claim 7, wherein said filter means of said centrifugal vessel is replaceable and made of combustible organic material.

11. A waste water treating apparatus according to claim 7, wherein said filter means of said centrifugal vessel is made of inorganic material capable of being regenerated by heating.

12. A waste water treating apparatus according to claim 11, wherein said filter means incorporates electrical resistance heating means for regenerating the filter by heat treatment while it remains in place in said centrifugal vessel.